Nov. 5, 1929.   J. W. OSTEN   1,734,339
AUTOMOBILE WINTER INCLOSURE AND HANDLE
Filed April 4, 1927   2 Sheets-Sheet 1
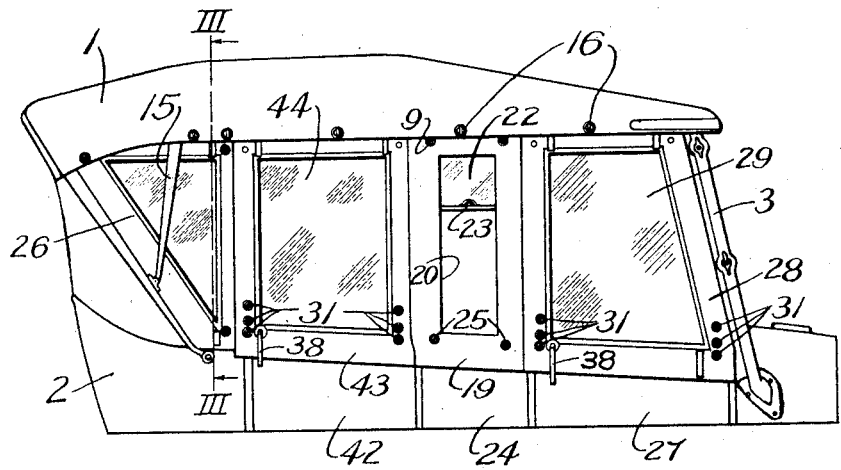
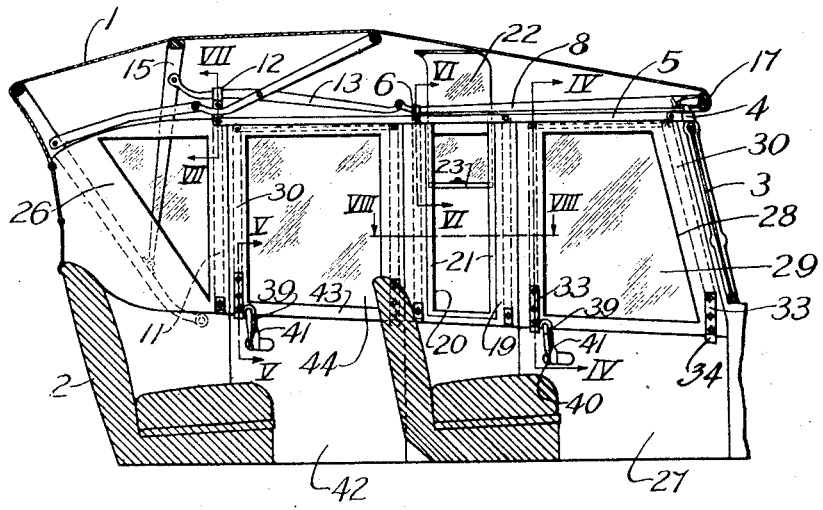
Inventor
Joseph W. Osten
by Charles W. Hill
Attys.

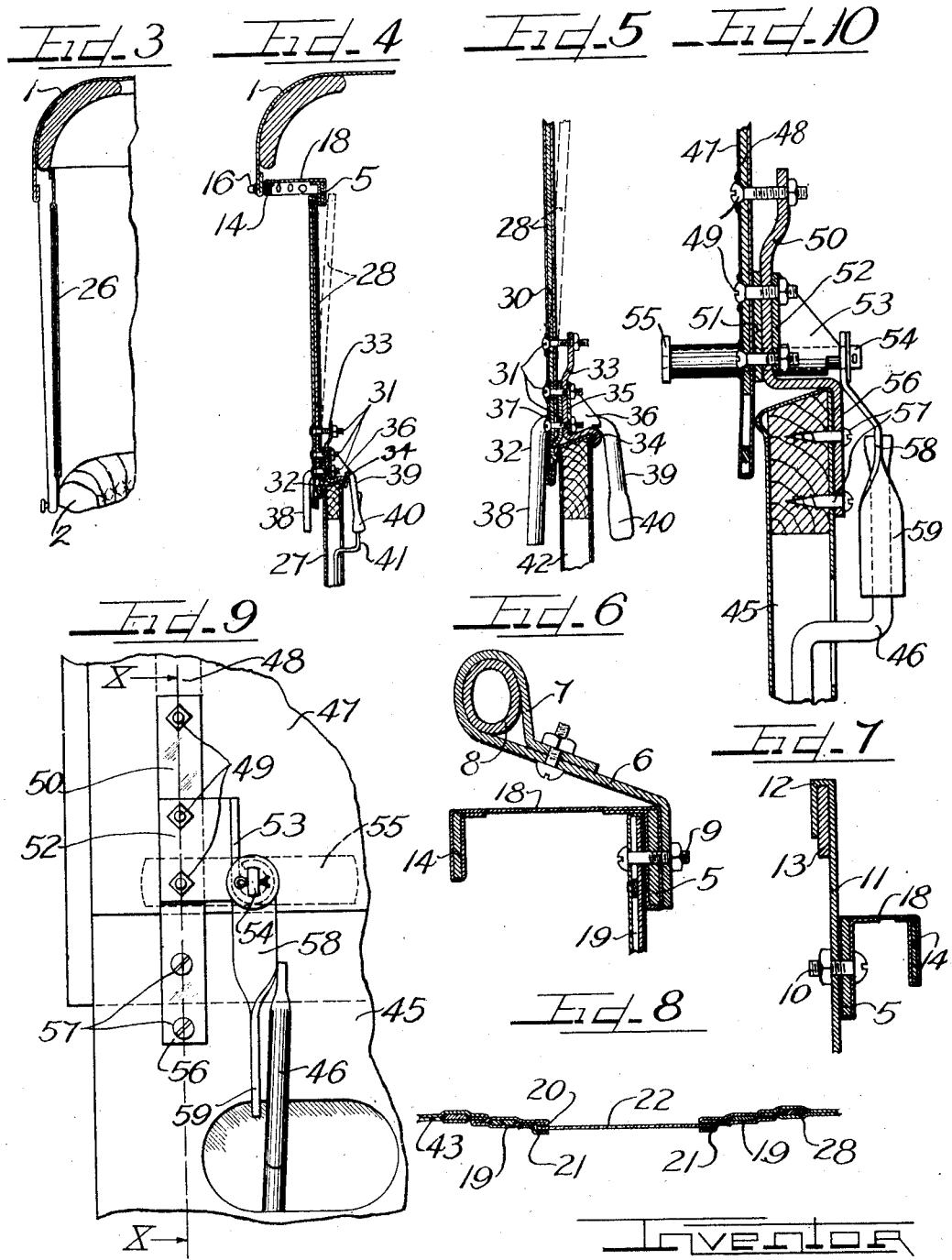

Patented Nov. 5, 1929

1,734,339

UNITED STATES PATENT OFFICE

JOSEPH W. OSTEN, OF CHICAGO, ILLINOIS, ASSIGNOR TO AUTO FABRICS PRODUCTS, INC., A CORPORATION OF ILLINOIS

AUTOMOBILE WINTER INCLOSURE AND HANDLE

Application filed April 4, 1927. Serial No. 180,639.

This invention relates to an improved type of winter closure for touring cars and more particularly to a winter closure in which one of the stationary side panels is provided with a vertically shiftable window while the door panels are equipped with auxiliary handle mechanisms adapted to coact with the standard door handles of the automobile to permit operation of said handles from the exterior of the automobile when the doors and their respective winter closure panels are in closed position.

It is an object of this invention to provide an automobile winter closure adapted to be readily mounted in position and wherein the door panels are provided with auxiliary exteriorly operable handles constructed to operate the regular handles of the door positioned on the inner sides of said doors.

It is also an object of this invention to provide an automobile winter closure wherein one of the stationary closure panels is equipped with a vertically slidable pane.

It is a further object of this invention to provide a winter closure wherein the door panel sections are provided with exteriorly operable means for releasing handles on the inner sides of the doors.

It is an important object of this invention to provide a touring car winter enclosure of simplified and improved construction adapted to be quickly mounted in position and having the stationary front panel sections equipped with vertically slidable windows while the closure sections associated with the doors are equipped with auxiliary handle mechanisms positioned to coact with handles mounted on the inner sides of the doors to permit opening of the doors from the outside of the automobile when the same is equipped with winter closures.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary side elevation of a touring type automobile equipped with a winter enclosure embodying the principles of this invention.

Figure 2 is a longitudinal vertical section of the same showing the interior of one side of the automobile.

Figure 3 is an enlarged fragmentary detail section taken on line III—III of Figure 1.

Figure 4 is an enlarged detail section taken on line IV—IV of Figure 2.

Figure 5 is an enlarged fragmentary detail section of the door panel and handle taken on line V—V of Figure 2.

Figure 6 is an enlarged detail section taken on line VI—VI of Figure 2.

Figure 7 is an enlarged detail section taken on line VII—VII of Figure 2.

Figure 8 is a fragmentary horizontal section of the closure taken on line VIII—VIII of Figure 2.

Figure 9 is an enlarged fragmentary portion of an automobile door and door closure section illustrating a modified form of auxiliary handle for use in operating the standard handle on the inner side of the door.

Figure 10 is a vertical detail section taken on line X—X of Figure 9.

As shown on the drawings:

Referring to Figures 1 to 8, inclusive, the reference numeral 1 indicates a Ford touring top supported in a standard manner upon an automobile body 2. Mounted on the forward end of the body 2 is a windshield 3 of the usual type. The winter closures for both sides of the automobile are of identical construction so that it will only be necessary to describe one of the same. Engaged around the upper end of the windshield side post directly beneath the front end of the top 1 is a U-shaped windshield clamp 4 the ends of which are apertured to permit the same to be rigidly secured by a bolt or other suitable means to the front end of a longitudinally extending inner frame bar or bumper strip 5. The bumper strip or bar 5 is supported intermediate its ends by means of a bumper bracket 6, as illustrated in Figure 6, and has one end thereof looped upon itself at 7 to engage around a standard supporting rod or member 8 forming a part of the brace frame for the top 1. The other end of the bumper bracket 6 is directed downwardly to the inside of the bumper strip 5 and is secured thereto by means of a bolt 9 or other suitable means. Secured to the rear end of the bumper bar 5 by means of a bolt 10 or other suitable means is the upper portion of a substantially vertical brace or connecting bar 11 the upper end of which is bent over to form a hook 12 adapted to be slidably engaged or hung over another top frame member or strut iron 13 of the automobile top. The brace bar 11 extends downwardly and has the lower end thereof secured to the body 2 of the car. The bumper bar 5 extends rearwardly from the windshield 3 to a point near the rear end of the automobile and is positioned substantially in the plane of the side of the body.

Positioned to the outside of the bumper bar 5 is an outer bar 14 the rear end of which is adapted to be engaged by a suitable clamping bracket to one of the rear bows 15 of the automobile top. The outer bar 14 extends forwardly substantially in the plane of the side of the top 1 and is secured on the inner side of said top by means of a plurality of spaced retaining clamps 16 of any desired type. The front end of the outer bar 14 is adapted to be connected by any suitable means to the front bow 17 of the automobile top. Connecting the inner bumper bar 5 and the outer bar 14 and bridging the space therebetween is a strong flexible fabric 18. Secured to the bumper bar 5 by means of bolts 9 or other suitable means is the upper margin of a stationary front side panel 19 having a window opening 20 therein. Mounted on the inner side of the front stationary panel 19 along the longitudinal margins of the opening 20 are guide channels 21 in which a vertically slidable transparent light or pane of flexible window material 22 of celluloid or any other suitable material is slidably mounted. The lower margin of the slidable window pane 22 may be provided with a stiffening bar 23 to facilitate movement of the slidable window pane 22. The upper end of the window pane 22 when moved upwardly in the guide frame 21 is adapted to be projected into the automobile top 1, as indicated in Figure 2. The lower margin of the front stationary closure section or panel 19 is adapted to be rigidly secured to a front body panel 24 by retaining members 25 of any suitable type.

The winter enclosure also embraces a rear stationary panel or section 26 provided with a transparent window pane and having one inclined margin secured to the back portion of the body 2 by any suitable retaining means. The upper margin of the rear stationary panel 26 is adapted to be secured on the inner side of the rear portion of the top 1 while the front margin of the rear panel 26 has the bar 11 projecting downwardly through a hem thereof, thereby holding said rear panel in position with the lower end or margin of said rear panel secured to the rear side portion of the body of the car.

Positioned to the outside and projecting above the front door 27 is a front door panel 28 having a transparent window pane 29 and a supporting or metal brace frame 30 the lower ends of the side members of which are apertured to receive retaining bolts 31. Engaged on each set of the two lower retaining bolts 31 to the inside of the front panel 28 is an outer or small door clamp 32 the lower end of which is hooked or bent to engage over the outer top bead or margin of the front door 27, as clearly shown in Figure 5. Engaged on each set of the three bolts 31 on the inner side of the panel 28 and adjacent the small door clamp 32 is a large door clamp 33 shaped as illustrated in Figure 5 and having a lower hook portion 34 adapted to rest upon the upper edge of the front door 27, with said hook portion 34 engaging around the upper inner bead or margin of said door. The front set of bolts 31 engaged through the lower front corner of the front panel 28 may now be tightened to secure the clamp members 32 and 33 with the lower hook portions thereof clamped on opposite sides of the upper margin of the door to hold the front panel in place with the inclined front margin of said panel formed to fit closely with the end of the windshield to complete the closure. Also engaged over the two lower bolts 31 of the set of bolts projecting through the rear margin of the panel 28 is an apertured flange or plate 35 which is integrally formed on a handle hinge bracket 36 the sleeve portion of which projects through a suitable opening in the panel 28 to permit the bight or connecting arm 37 of an auxiliary handle mechanism to project therethrough. The handle mechanism is pivotally supported in the hinge bracket 36 and has an outer handle bar 38 integrally formed on the outer end of the bight portion 37. Integrally formed on the inner end of the bight 37 is an inner handle or arm 39 the end of which is flattened to afford a head 40 which is adjacent the projecting end of a standard door handle 41 of the automobile to coact therewith. With the auxiliary handle mechanism and the clamps 32 and 33 mounted in position, as described, the rear set of retaining bolts 31 may be tightened to securely fasten the hook portions of the clamps on the upper beaded margin of the door, with the two lower bolts acting to rigidly hold the handle hinge bracket 36 in place so that when the door and the front panel is closed the outer auxiliary handle 38 may be actuated to operate the inner auxiliary handle 39 to cause the same to actuate the automobile handle 41 to release the same to permit opening of the door from the outside.

Mounted on each rear door 42 of the automobile is a rear door panel 43 having a transparent pane 44 constructed of any suitable material. The rear door panel 43 is also provided with a reinforcing metal brace frame 30 the lower portion of which is mounted on the upper margin of the door 42 in a manner similar to the mounting of the front door panel 28. The side margins of the rear door panel 43 are positioned to overlap the rear side margin of the front panel 19 and the front margin of the rear stationary panel 26. The front margin of the stationary front panel 19 is overlapped by the rear side margin of the front door panel 28 when the same is closed.

The winter closure, as described, is adapted to completely close the side space between the body and the top of the automobile and between the windshield and the rear portion of the top, with the supporting hook member 12 at the rear end of the inner bumper bar 5 supported on the strut iron 13 in a manner permitting any variations in the size of standard automobile tops to be compensated for when a winter enclosure of the type described is to be installed on an automobile. The improved closure also provides front and rear door auxiliary handle mechanisms supported by the respective front and rear door closure panels, with said auxiliary handle mechanisms having the inner arms thereof in co-acting relation with the standard door handles 41 of the automobile which would not be accessible from the exterior of the car when the winter closure is in position. This arrangement dispenses with providing openings, pockets, or slits in the door closure panels through which a person's hand must be projected in order to be able to operate the door handles 41 which are usually positioned on the inner sides of the doors in Ford touring cars. To permit suitable ventilation the window pane 22 in the front stationary panel 19 on each side of the car is slidably mounted to permit the window pane 22 to be pushed upwardly when desired, as illustrated in Figure 2.

Figures 9 and 10 of the drawings illustrate a modified form of a winter closure handle mechanism and supporting brackets therefor associated with a door closure panel. In this connection, the reference numeral 45 indicates a touring car door provided with the usual handle 46 mounted on the inner side of the door. Supported on the door is a winter closure panel 47 having a reinforcing frame 48 the lower end of the side bar of which is provided with a plurality of apertures to receive retaining bolts 49. Engaged on the inner threaded ends of the bolts 49 to the inside of the closure panel 48 is a supporting bracket or clamp 50. The intermediate portion of the bracket 50 is directed inwardly over the top of the door 45 and then downwardly in the form of a mounting plate 56 positioned flat against the inner side of the door and having apertures therein for receiving mounting screws 57 for rigidly holding the bracket in position on the door. Positioned on the two lower bolts 49 between the bracket 50 and the rear inner side of the closure panel 47 is a filler bar or plate 51. Engaged on the inner ends of the two lower retaining bolts 48 to the inside of the bracket 50 is an apertured flange or plate 52 which is integrally formed at right angles on a hinge bracket 53. The sleeve portion of the hinge bracket 53 projects transversely above the top of the door through an opening in the closure panel 47. Projecting through the sleeve of the hinge bracket 53 is a handle bar or shaft 54 on the outer end of which a transverse handle or bar 55 is engaged to permit the handle bar 54 to be rocked or rotated in its support. Engaged on the inner end of the handle bar or shaft 54 is an inner handle or arm 58 the lower end of which is twisted to form a flat head 59 positioned adjacent the upper end of the door handle 46 in such a manner that when the outer auxiliary handle 55 is operated or rotated the shaft 54 acts to operate the inner auxiliary handle 58 into coacting relation with the door handle 46 to release the same to permit opening of the automobile door from the outside of the automobile, thereby doing away with slots or openings in the door closure panel.

The improved winter closure of this invention affords a ready means for converting an ordinary Ford touring car top into a winter top in a comparatively short time due to the simple construction of the winter closure and the simple means provided for mounting the winter closure in place connected with the automobile top, with the windshield, and with the frame members of said top. The material 18 bridging the space between the bumper bar 5 and the outer bar 14 closes the space between the side margins of the automobile top and the bumper bar to which the stationary side closure panels are secured and against which the upper margins of the door closure panels are adapted to resiliently engage when the vehicle doors are closed. The hook brackets or bars 11 secured to the rear ends of the bumper bars 5 are adjustable on the strut irons 13 before the lower ends of said bars 11 are secured to the body of the automobile. The provision of the hook supporting bars at the rear ends of the bumper bars 5 permits the winter closures to be readily mounted on standard Ford touring cars and allows for any variation in the length of the touring car tops. To make the winter closures free from handle openings or slots to permit access through the closure panels to the handles of the inner sides of the automobile doors, auxiliary handle mechanisms have been provided on the door closure panels with said handle mechanisms operable from the outside of the automobile when the doors are closed to permit the inner portions of said handle mechanisms to coact with the door handles to release the same. This arrangement permits the doors to be opened from the outside of the automobile when equipped with the winter closure sides and eliminates the use of openings. To permit ventilation of the interor of the closed winter top when desired the front stationary closure panels 19 are provided with vertically slidable window panes 22 which are adapted to be pushed upwardly on the inner side of the automobile top 1, as illustrated in Figure 2.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination with an automobile door and a handle therefor, a member removably secured to the top of the door, a window frame having a supporting member carried by the first named member, a bracket secured to the first named member and to the supporting member, and an arm pivoted on the bracket and extending therethrough to actuate the door handle.

2. In combination with an automobile door and a handle therefor, a member removably secured to the top of the door and having an upwardly extending portion, a window frame having a member secured to the upwardly extending portion of the first named member, a bracket secured to the upwardly extending portion of the first named member and to the window frame member, and an arm pivoted on the bracket and extending therethrough to actuate the door handle.

In testimony whereof I have hereunto subscribed my name.

JOSEPH W. OSTEN.